US012640051B1

(12) United States Patent
Pemmaraju Venkata

(10) Patent No.: US 12,640,051 B1
(45) Date of Patent: May 26, 2026

(54) SEGMENTED MUSIC PRACTICE AND LEARNING SYSTEM

(71) Applicant: Sitaram Kumar Pemmaraju Venkata, Woodinville, WA (US)

(72) Inventor: Sitaram Kumar Pemmaraju Venkata, Woodinville, WA (US)

( * ) Notice: Subject to any disclaimer, the term of this patent is extended or adjusted under 35 U.S.C. 154(b) by 0 days.

(21) Appl. No.: 19/010,284

(22) Filed: Jan. 6, 2025

(51) Int. Cl.
*G09B 15/00* (2006.01)
*G06F 3/0488* (2022.01)
*G06F 3/16* (2006.01)
*G11B 27/34* (2006.01)

(52) U.S. Cl.
CPC ........... *G09B 15/00* (2013.01); *G06F 3/0488* (2013.01); *G06F 3/165* (2013.01); *G11B 27/34* (2013.01)

(58) Field of Classification Search
CPC ....... G09B 15/00; G06F 3/0488; G06F 3/165; G11B 27/34
See application file for complete search history.

(56) References Cited

U.S. PATENT DOCUMENTS

| | | | |
|---|---|---|---|
| 7,426,157 B2 * | 9/2008 | Arnold | G04G 15/00 368/111 |
| 11,880,507 B1 * | 1/2024 | Choi | G06F 3/016 |

| | | | |
|---|---|---|---|
| 12,293,072 B1 * | 5/2025 | Walecka | G10H 1/38 |
| 2022/0172638 A1 * | 6/2022 | Aharonson | G09B 15/00 |
| 2022/0172640 A1 * | 6/2022 | Aharonson | G09B 5/02 |
| 2022/0180766 A1 * | 6/2022 | Aharonson | G09B 15/00 |
| 2024/0144901 A1 * | 5/2024 | Maggiore | G10H 1/0008 |

* cited by examiner

*Primary Examiner* — Jeffrey Donels
(74) *Attorney, Agent, or Firm* — Gugliotta & Gugliotta LPA

(57) ABSTRACT

A system and method for segmented music practice provides precise control over musical content division and practice implementation through digital means. The system receives audio content through direct recording or file import, maintains segment definitions with independent timing parameters in a database, and implements gesture-based practice controls. A segmentation engine enables users to define precise segment boundaries within musical content, storing segment metadata separately from audio data. The practice interface implements tap functionality for single playback and hold functionality for continuous repetition while maintaining consistent segment boundaries. Multi-tiered authorization protocols govern content sharing between instructors and students, with granular permissions at the segment level. The system tracks practice progress and enables incremental combination of mastered segments, facilitating systematic progression through complex musical pieces while maintaining practice efficiency and instructor oversight.

12 Claims, 8 Drawing Sheets

Home Screen

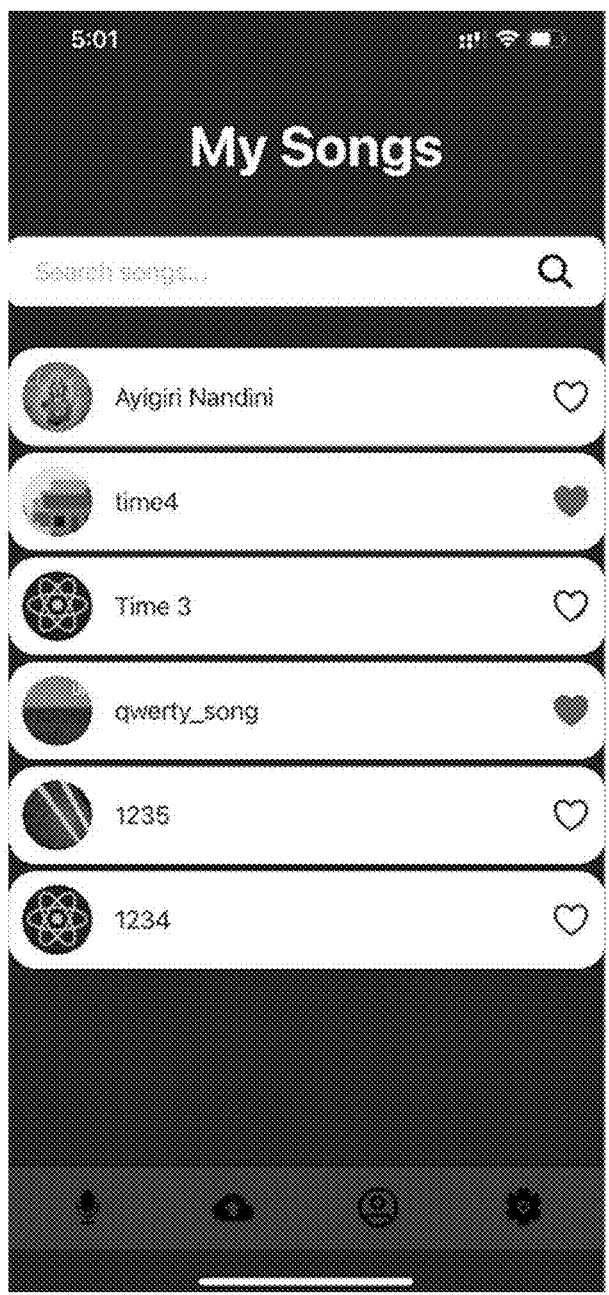
FIG. 1 – Home Screen

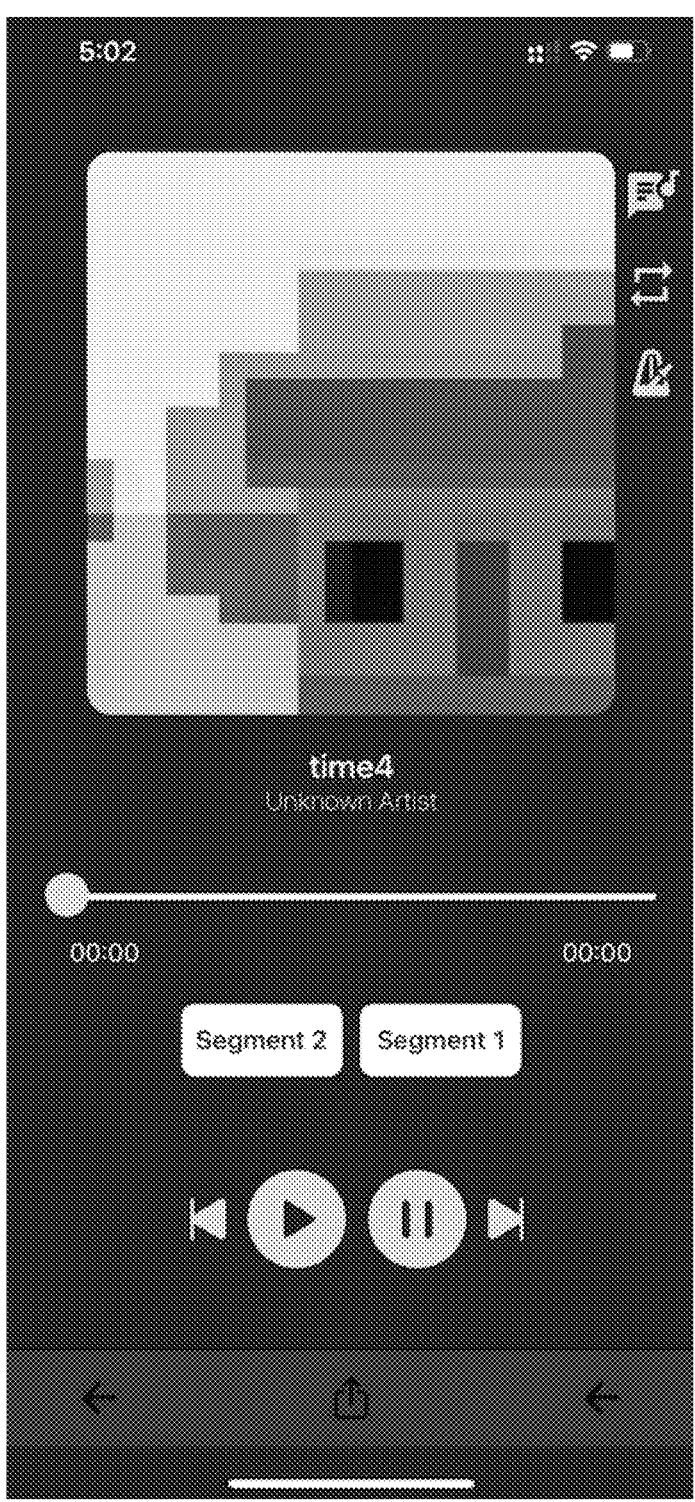
FIG. 2 -Playing

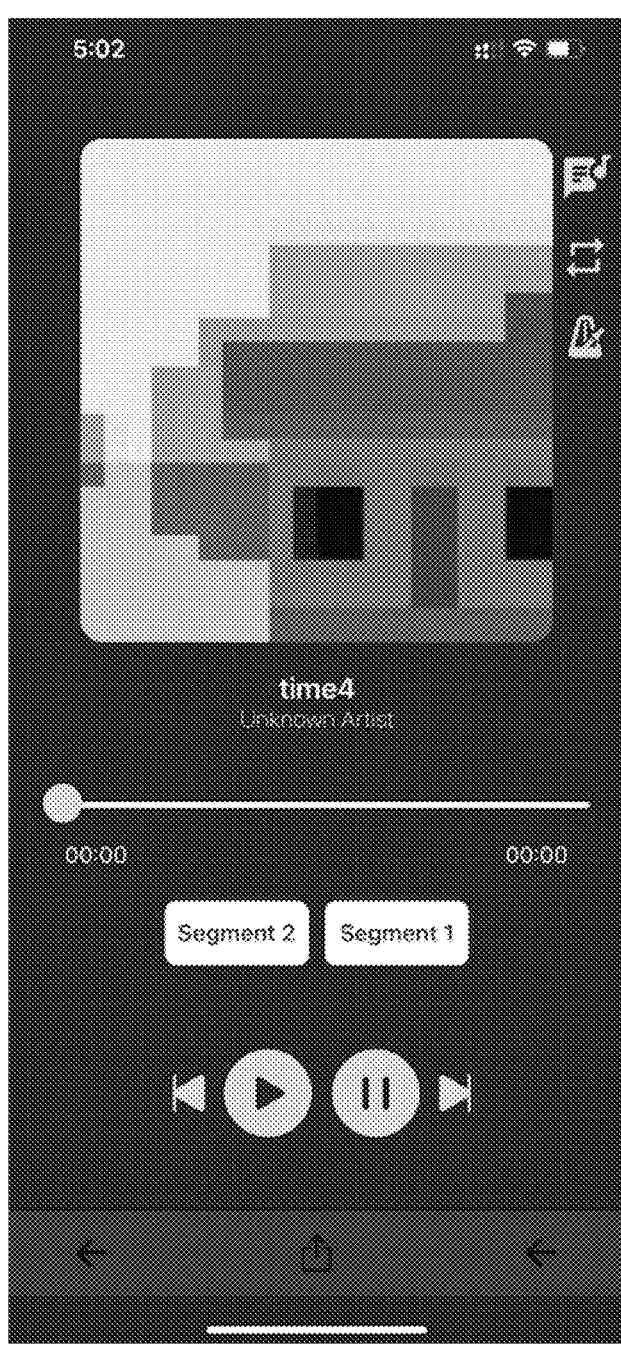
FIG. 3 – Recorder

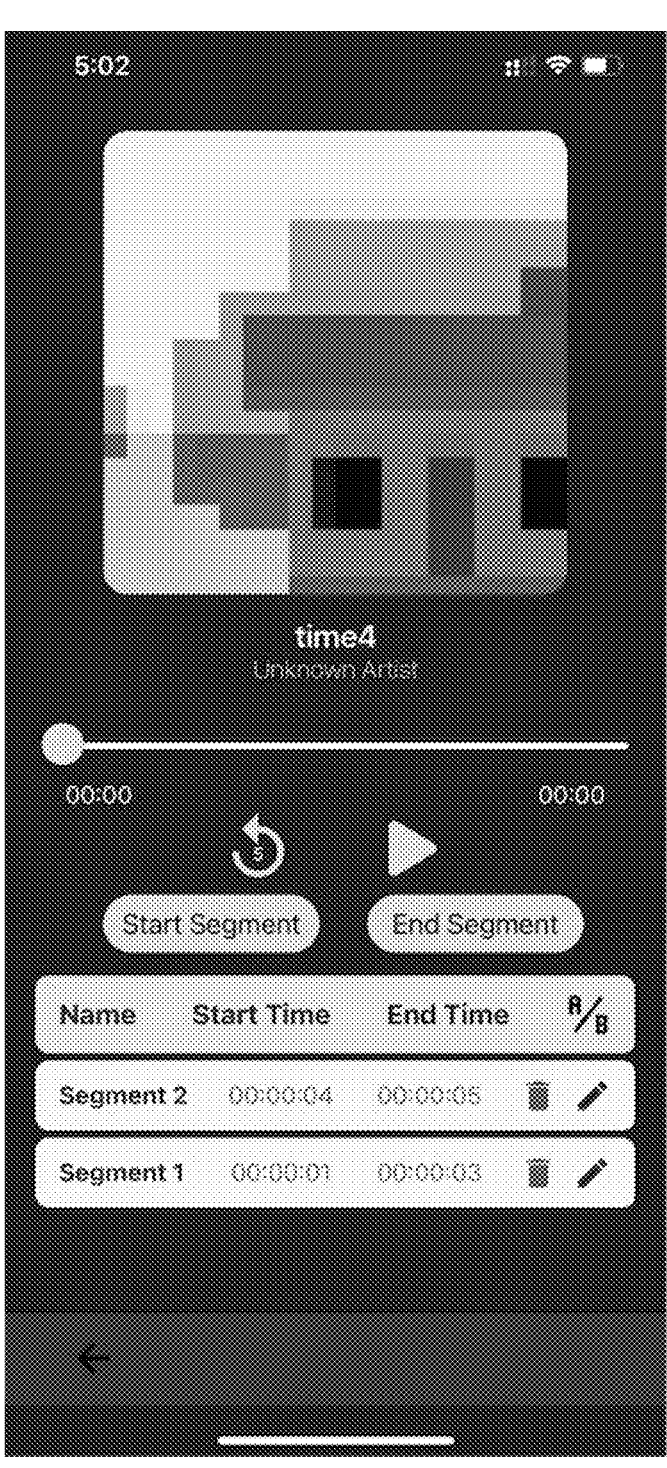
FIG. 4 – Segmentor

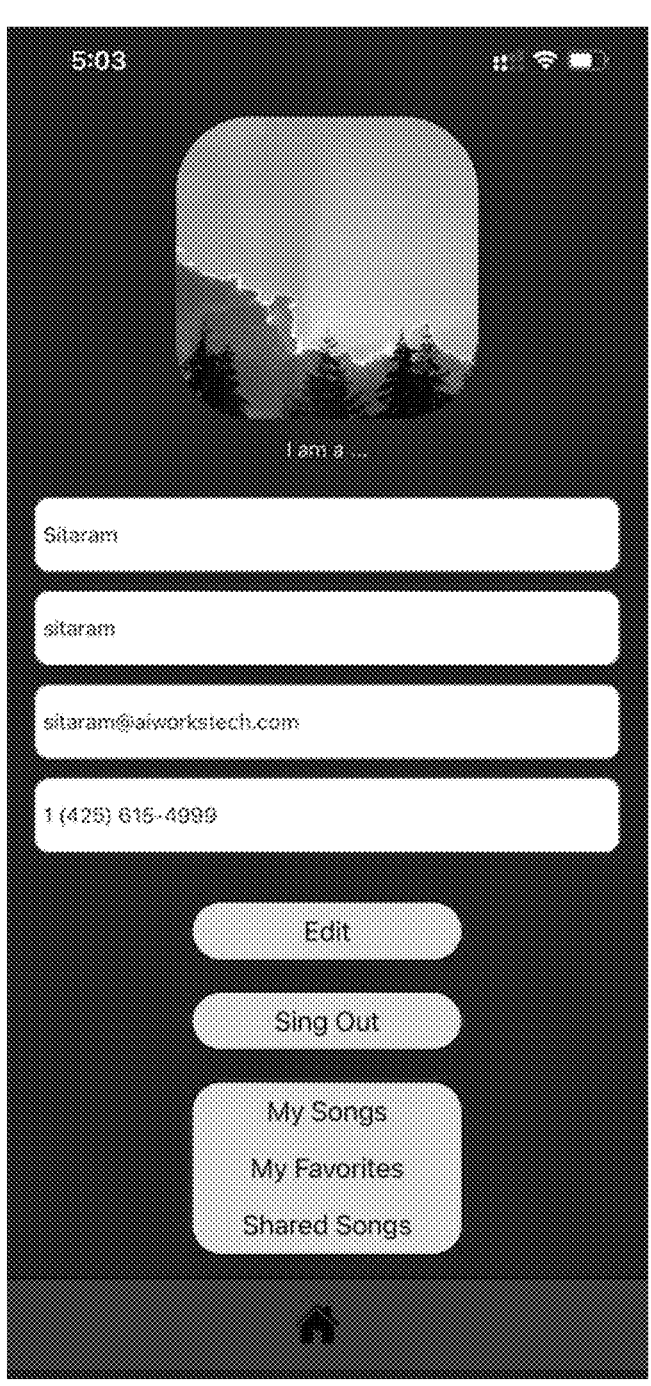
FIG. 5 – Profile

FIG. 6 – My Songs

FIG. 7 - My Favorites

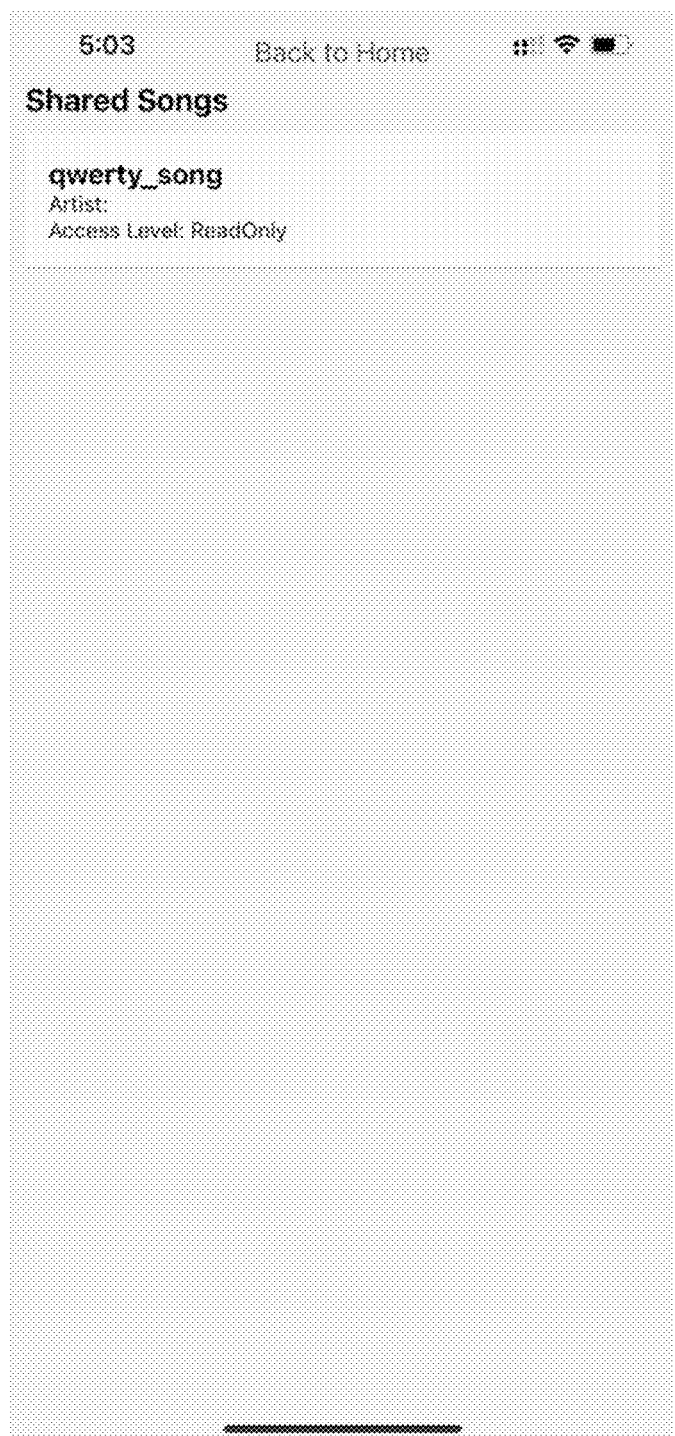
FIG. 8 – Shared Songs

SEGMENTED MUSIC PRACTICE AND LEARNING SYSTEM

CROSS-REFERENCE TO RELATED APPLICATIONS

There are no previously filed, nor currently any co-pending applications, anywhere in the world.

BACKGROUND OF THE INVENTION

1. Field of the Invention

The present invention relates generally to music education systems and, more particularly, to a digital music education systems and methods that are computer-implemented for segmented practice management through integrated content division, repetition control, and instructor-guided access mechanisms.

2. Description of the Related Art

Music education and practice methodologies have undergone significant evolution with the advancement of digital technologies. Traditional music instruction typically involves an instructor demonstrating musical passages, with students attempting to replicate these passages through repetitive practice. This fundamental approach, while effective, presents several technological and pedagogical challenges in contemporary educational environments.

In conventional music practice scenarios, students frequently encounter difficulties in efficiently managing practice sessions, particularly when working with complex musical pieces. The traditional approach of practicing entire compositions or large sections often results in inefficient use of practice time and potentially reinforces errors when students repeatedly practice problematic passages without proper guidance or structure.

Several specific problems persist in current music practice environments. First, students frequently struggle to isolate and focus on challenging passages within larger musical works. Traditional audio playback systems require manual intervention to repeatedly play specific sections, leading to interruptions in practice flow and inconsistent segment boundaries during repetition.

Second, music instructors face significant challenges in remotely monitoring and guiding student practice sessions. Existing systems typically lack mechanisms for instructors to define specific practice segments for individual students or to track adherence to prescribed practice routines.

Third, current digital practice tools generally fail to provide adequate control over practice segment repetition, often requiring students to manually restart segments or manage complex loop settings, which disrupts the learning process and reduces practice efficiency.

Fourth, the sharing and management of practice materials between instructors and students remains problematic, with most existing solutions offering either too broad or too limited access controls, preventing effective customization of practice materials for individual students.

Existing digital music practice tools typically provide basic playback functionality, including the ability to adjust tempo or create simple loops. However, these solutions lack sophisticated mechanisms for precise segment definition, controlled repetition, and integrated instructor oversight. Current systems often fail to address the specific needs of both instructors and students in maintaining structured practice routines and tracking progress effectively. Consequently, while the concept of segmented learning is known in the art, a need exists for a specific technical implementation that enables precise control over segment definition, repetition, and access through a novel combination of user interface elements, database management, and permission systems. Such an implementation can produce the technical effect of enabling more efficient and controlled music practice while maintaining instructor oversight at a granular level.

SUMMARY OF THE INVENTION

The present invention is directed to providing an integrated digital music practice system that enables precise segmentation of musical content with configurable repetition controls while maintaining instructor-guided access management, thereby facilitating more effective and structured music learning processes. This represents a non-obvious advance over existing solutions, which typically focus on either basic segment repetition or general music practice functionality, but do not integrate these elements with precise control mechanisms and granular access management in the manner implemented by the present invention.

Briefly describe according to the preferred embodiment, the present invention, referred to as "ULoop™" provides a comprehensive method and apparatus for segmented music practice through digital means. The system enables precise division of musical content into practice segments, configurable repetition mechanisms, and controlled sharing capabilities between instructors and students. By implementing a "Progressive Mastery" methodology that systematically approaches segment-based learning through controlled repetition for skill development, the present invention enables incremental combination of mastered segments while maintaining structured progress tracking.

The creation of an integrated learning environment facilitates direct interaction between instructors and students through controlled content sharing mechanisms. The system supports personalized practice segment definition and enables customizable learning paths based on individual student needs. Technical implementation incorporates database-driven segment management with real-time audio processing capabilities. The system optimizes user interface elements specifically for practice scenarios while maintaining secure content sharing infrastructure throughout all operations.

The present invention represents a comprehensive solution for modern music education, combining technological innovation with established pedagogical principles to enhance the learning experience through structured, segment-based practice methodologies.

It is an advantage of the present invention that it provides precise digital segmentation of musical content with automated boundary preservation, enabling consistent practice of specific passages without manual intervention.

It is another advantage of the present invention that it implements gesture-based repetition control through tap and hold functionalities, thereby facilitating uninterrupted practice sessions while maintaining precise segment boundaries.

It is another advantage of the present invention that it enables instructor-defined practice segments with specific metadata, allowing for customized practice routines tailored to individual student needs.

It is another advantage of the present invention that it maintains segment-specific access controls within a hierarchical permission system, ensuring appropriate content distribution while preserving instructor oversight.

It is another advantage of the present invention that it provides persistent storage of segment definitions independent of the source audio content, enabling efficient content management and reuse across multiple practice sessions.

It is another advantage of the present invention that it facilitates seamless integration of recording and importing functionalities, allowing flexible content acquisition while maintaining consistent segment management capabilities.

It is another advantage of the present invention that it implements real-time visual feedback during practice sessions, enabling immediate recognition of active segments and practice progress.

It is another advantage of the present invention that it allows for incremental combination of mastered segments, facilitating systematic progression through complex musical pieces while maintaining practice efficiency.

It is another advantage of the present invention that it provides integrated progress tracking mechanisms, enabling comprehensive monitoring of student practice patterns and segment mastery levels.

It is another advantage of the present invention that it maintains secure separation of content access between different instructor-student relationships, allowing multiple teaching relationships without content overlap.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

FIG. 1 depicts a Home Screen, displaying a primary interface of the system, showcasing options for navigation, user access, and core functionalities;

FIG. 2 depicts a Playing interface, illustrating the playback interface, including controls for audio play, pause, and navigation through segments;

FIG. 3 depicts the recording functionality, highlighting features to record and save new audio inputs directly within the application;

FIG. 4 represents the segmentation engine interface, allowing users to define and manage precise boundaries within musical content;

FIG. 5 shows the user profile page, where users can manage their account settings, progress, and preferences;

FIG. 6 provides an overview of the user's library, featuring stored musical content segmented for practice;

FIG. 7 highlights a personalized list of frequently used or preferred segments or songs; and FIG. 8 demonstrates the shared content management interface, enabling controlled access and distribution of musical content between users.

DETAILED DESCRIPTION OF THE INVENTION

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

The best mode for carrying out the invention is presented in terms of its preferred embodiment, herein depicted within FIGS. 1-8. The present invention implements a segmented music practice system through an integrated mobile application architecture comprising multiple interconnected subsystems.

The system architecture comprises four primary subsystems working in concert to enable segmented music practice: a music input subsystem, a segmentation engine, a practice control interface, and an access control system.

These subsystems are manifested through a series of user interfaces, as depicted in FIGS. 1-8, each serving specific functional purposes within the overall system architecture.

The system implements a client-server architecture wherein a mobile client application (100) communicates with a centralized server (not shown) through encrypted WebSocket connections. The server maintains a relational database implementing the following schema for segment management:

Segment metadata is stored in a primary segments table containing:

segment_id: UUID primary key
content_id: Foreign key to audio content
start_time: Integer (milliseconds from start)
end_time: Integer (milliseconds from start)
created_by: User reference
access_control_list: JSON structure
practice_metrics: JSON structure FIG. 1 illustrates the Home Screen interface (110) comprising a navigation bar (111) with microphone icon (112) for recording access, cloud icon (113) for content synchronization, user profile icon (114), and settings icon (115). The main content area (116) displays a scrollable list of audio content items (117), each with an associated favorite toggle button (118).

The Playing interface (200) shown in FIG. 2 implements the practice control system, comprising a primary waveform display (210), segment selection buttons (220, 221), and a gesture control region (230). The gesture control region (230) processes touch inputs to distinguish between tap gestures for single playback and hold gestures (>500 ms) for continuous repetition.

FIG. 3 depicts the Recorder interface (300) comprising a recording initiation button (310), audio level meter (320), and format selection controls (330). The recording subsystem implements a 48 kHz sampling rate with 16-bit depth, utilizing the device's primary microphone with optional external microphone support through the audio input port. The Recorder interface provides high-fidelity audio capture capabilities with configurable quality settings and real-time monitoring. Captured content is automatically processed and integrated into the user's library, viewable through the My Songs interface shown in FIG. 6. The file import functionality supports multiple audio formats, processing imported content through the same pipeline as directly recorded material. Both recording and import processes generate standardized internal representations of audio content, ensuring consistent behavior during subsequent segmentation and practice operations.

Central to the invention's operation, the segmentation engine is controlled through the Segmentor interface illustrated in FIG. 4, enabling precise definition of practice segments within musical content. Users interact with a visual representation of the audio waveform, establishing segment boundaries through touch-based interaction. The interface provides fine-grained control over boundary placement, with visual feedback confirming segment definitions. Each defined segment maintains independent metadata, including precise timing information for start and end points, practice-related annotations, performance tracking metrics, and access control parameters. The segmentation data is maintained separately from the source audio content in the system's database, enabling efficient segment manipulation without affecting the original recording. This separation also facilitates segment sharing and reuse across different practice contexts. The Segmentor interface (400) shown in FIG. 4 provides precise segment boundary definition through dedicated Start Segment (410) and End Segment (420) controls. A segment timeline (430) displays defined segments with millisecond-precision timing indicators (431, 432). The interface maintains a local segment cache synchronized with the server through an eventual consistency model.

The Profile interface (500) of FIG. 5 maintains user configuration and progress tracking, implementing a hierarchical data structure for practice metrics:

Total practice duration per segment
Success rate calculations
Progress indicators
Performance trending The practice control interface, primarily manifested in the Playing Interface shown in FIG. 2, implements sophisticated interaction mechanisms for segment practice. The interface provides tap functionality for single playback iterations and hold functionality for continuous repetition. Visual feedback, synchronized with playback, indicates the currently active segment and practice progress. The interface maintains consistent segment boundaries during repetition, ensuring practice accuracy across multiple iterations.

The access control system, managed through the Shared Songs interface depicted in FIG. 8, implements multi-tiered authorization protocols for content sharing. The system supports instructor-specific content sharing, student-specific access controls, public/private content designation, and segment-level permission granularity. These controls ensure appropriate content distribution while maintaining instructor oversight.

The Home Screen, depicted in FIG. 1, serves as the primary navigation hub, providing access to all system functionalities through an intuitive layout. The interface hierarchy follows a logical progression from content acquisition through practice implementation. Content management functionalities are provided through the My Songs interface of FIG. 6, which enables library management, while the My Favorites interface shown in FIG. 7 enables quick access to frequently used content. The Profile interface, illustrated in FIG. 5, maintains user preferences and progress tracking information. The My Songs interface (600) shown in FIG. 6 implements a virtual list view (610) for efficient memory management of large content libraries. Each content item comprises a thumbnail (611), title (612), and access control indicators (613). The system implements lazy loading of audio content with a local cache limit of 500 MB.

FIG. 7 depicts the My Favorites interface (700), which extends the virtual list implementation with additional metadata for frequently accessed content. The favoriting system maintains a priority queue data structure for efficient access pattern recognition.

The Shared Songs interface (800) of FIG. 8 implements a role-based access control system with the following permission levels:

Owner: Full control of content and access rights
Instructor: Segment definition and student assignment capabilities
Student: Practice access with progress tracking
Public: Read-only access to designated content The access control system implements a hierarchical permission model where segment-level permissions inherit from and can override content-level permissions. Permission changes trigger real-time WebSocket events to maintain consistency across connected clients.

2. Operation of the Preferred Embodiment

In operation, users typically begin by recording or importing content through the Recorder interface of FIG. 3, with results appearing in the My Songs library depicted in FIG. 6. Users then proceed to define practice segments within their content using the Segmentor interface shown in FIG. 4, establishing precise boundaries and metadata. Practice execution occurs through the Playing Interface of FIG. 2, where users engage with defined segments using tap and hold gestures for controlled repetition. Progress tracking is maintained through the Profile interface depicted in FIG. 5, which provides insights into practice patterns and segment mastery levels. Content sharing is facilitated through the Shared Songs interface of FIG. 8, where instructors can distribute content while maintaining appropriate access controls.

This integrated approach ensures consistent user experience across all system functionalities while maintaining precise control over practice segments and access permissions, thereby enabling effective implementation of segmented learning methodologies in music education contexts.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. A computer-implemented method for segmented music practice, comprising:
   receiving, by a processor, audio content;
   generating, in a database, segment definitions for the audio content, each segment definition comprising start and end timing parameters;
   providing a practice interface enabling selective playback of defined segments;
   implementing gesture-based segment control, wherein a tap gesture initiates single playback of a selected segment and a hold gesture initiates repeated playback of the selected segment; and
   maintaining access controls for segment sharing between users.

2. The method of claim 1, wherein said receiving, by a processor, audio content comprises at least one of: recording audio through a recording interface; and importing audio files through a file import interface.

3. The method of claim 1, wherein generating segment definitions comprises:
   displaying a visual waveform representation of the audio content;
   receiving user input designating start and end segment boundaries within the visual waveform representation through touch-baed interaction;

storing segment metadata in a database separate from the audio content; and
maintaining timing information for segment start and end boundaries independent of the audio content.

4. The method of claim 1, wherein implementing gesture-based segment control further comprises:
   providing visual feedback indicating an active segment during playback through waveform highlighting;
   maintaining consistent segment start and end boundaries during the repeated playback; and
   enabling the repeated playback to continue across multiple iterations.

5. The method of claim 1, wherein maintaining access controls comprises:
   implementing multi-tiered authorization protocols including instructor, student, and public permission levels;
   enabling instructor-specific content sharing with segment definition capabilities;
   providing student-specific access controls with practice access and progress traking; and
   supporting segment level permissions that inherit from and can override content-level permissions.

6. The method of claim 1, further comprising:
   tracking practice progress for individual segments including total practice duration;
   storing performance metrics associated with each; and
   providing visual feedback indicating segment skill mastery levels through progress indicators reflecting the stored performance metrics.

7. A system for segmented music practice, comprising:
   a processor;
   a memory storing instructions that, when executed by the processor, cause the system to:
      receive audio content through at least one input mechanism selected from recording and file import;
      maintain a database of segment definitions for the audio content, each segment definition including start time and end time parameters;
      provide a practice interface with gesture-based segment control distinguishing between tap gestures for single playback and hold gestures for continuous repetition, wherein the practice interface comprises:
         controls for segment selection through touch interaction;
         tap functionality for single segment playback initiation;
         hold functionality for continuous segment repetition; and
         visual feedback indicating currently active segments during playback through waveform highlighting; and
      implement role-based access controls for content sharing between instructors and students.

8. The system of claim 7, wherein hierarchical access controls comprise:
   instructor level permissions for content distribution and segment definition;
   student-level permissions for content access and practice session tracking;
   segment-specific sharing controls; and
   public and private content designation options.

9. The system of claim 7, wherein the instruction further cause the system to:
   track practice patterns for individual segments including session duration and frequency;
   maintain progress metrics across multiple practice sessions;

provide visual indicators of segment progress; and
13enable incremental combination of mastered segments.

10. A non-transitory computer-readable medium storing instructions that, when executed by a processor, implement a method for segmented music practice comprising:

receiving audio content through recording or file import mechanisms;

maintaining segment definitions in a database with start and end timing parameters stored separately from audio files, wherein maintaining segment definitions comprises:

storing segment boundaries independent of audio content;

preserving segment metadata separate from audio data;

enabling segment annotation; and tracking segment-specific practice metrics;

implementing gesture-based segment control distinguishing tap gestures for single playback from hold gestures for continuous repetition; and managing role-based access controls with multi-tiered access controls with insturtor, student, and public permission levels.

11. The computer-readable medium of claim 10, wherein implementing gesture-based segment control comprises:

providing tap functionality for single playback of selected segments;

enabling hold functionality for continuous repetition;

maintaining consistent segment boundaries during the continuous repetition; and displaying visual feedback during playback including waveform highlighting and progress indicators.

12. The computer-readable medium of claim 10, wherein managing hierarchical access controls comprises:

implementing instructor-specific sharing capabilities for content distribution and segment definition;

maintaining student-specific permissions for practice and progress tracking;

enabling segment-level permission controls; and maintaining secure separation of content access between multiple instructor-student relationships.

\* \* \* \* \*